Feb. 4, 1947.  A. A. BUSHNELL  2,415,384
EYE COVER
Filed July 10, 1945

INVENTOR
ARTHUR A. BUSHNELL.
BY
ATTORNEY

Patented Feb. 4, 1947

2,415,384

UNITED STATES PATENT OFFICE 2,415,384

EYE COVER

Arthur A. Bushnell, Port Crane, N. Y.

Application July 10, 1945, Serial No. 604,230

3 Claims. (Cl. 128—156)

This invention relates to an eye cover for persons who have lost an eye.

When an eye has been injured to the extent of requiring removal of the eyeball, it is customary to insert an artificial eye. Since an artificial eye should be specially made to match the color and pattern of the other eye, there is a more or less extended period when a temporary eye cover, which can be supplied immediately, is helpful.

Furthermore, eyes are sometimes injured in such a way that the eyelids do not function normally and cannot keep an artificial eye clear by winking, as a normal eye does. Also, the tear duct is sometimes destroyed and the eye liquids cannot drain in the normal way but must come out over the lower eyelid. In either case an artificial eye becomes covered with discharge quickly and requires removal and cleaning every few hours, to avoid an unsightly appearance. In such cases an eye cover may be more practical to wear normally than an artificial eye.

It is an object of my invention to provide an eye cover which is more convenient to apply and to wear and which presents a neater appearance than the usual patch.

Another object is to provide an eye cover capable of holding a piece of absorbent cotton out of sight behind it, in position to absorb any discharge from the eye.

Other objects of the invention will be pointed out in the following description and claims and illustrated in the accompanying drawing, which discloses, by way of example, the principle of the invention and the best mode, which has been contemplated, of applying that principle.

Figure 1:
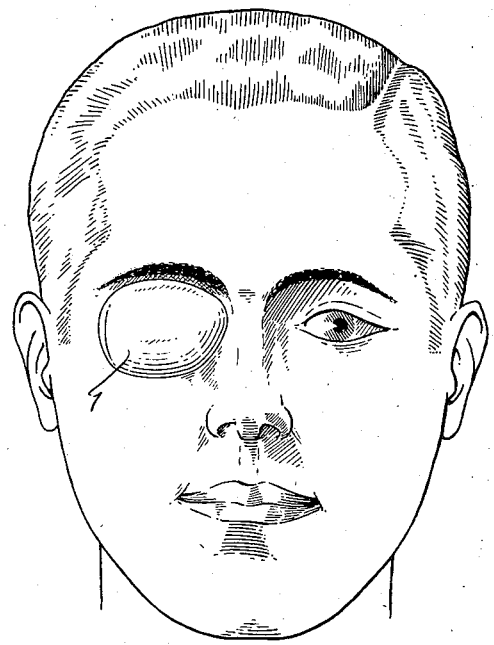
Fig. 1 is a front view of the eye cover in place.
Figure 2:
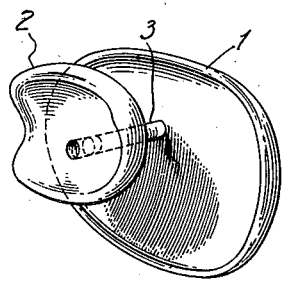
Fig. 2 is a perspective view of the eye cover.
Figure 3:
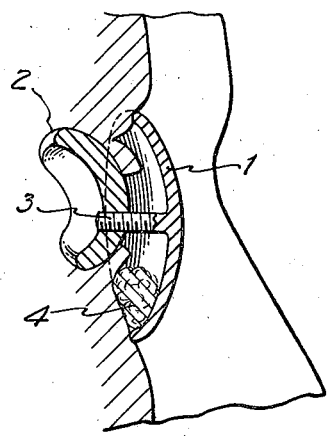
Fig. 3 is a vertical sectional view of the eye cover and adjacent tissues.

The eye cover consists of a cover plate 1, a base 2, and a post 3 interconnecting the base and cover plate. Both the cover plate and the base are of concavo-convex shape and are interconnected in nested, spaced relation by the post. The base is shaped to fit into the eye socket and is accordingly similar in shape to an artificial eye. The post may be rigid with both the base and the cover plate, or may be detachably connected to either the base or the cover plate or both. In the form shown in the drawing, the post is rigid with the cover plate and screws into a threaded hole in the base. The concave rear side of the cover plate serves to hold in place a wad of absorbent cotton 4 to receive any discharge from the eye socket.

Any suitable material can be used for the eye cover, but I prefer to use a thermoplastic material for the base and flesh colored plastic material having a moderate amount of flexibility for the cover plate. The post may also be of thermo-plastic material, or of a non-corrosive and non-irritating metal.

In applying the eye cover, the base cup is inserted into the eye socket and a wad of cotton placed behind the cover plate before or after the insertion. The cover plate is retained in position without further support, thus dispensing with the bands required to support the usual eye patch.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. An eye cover comprising a base shaped to fit in the eye socket, a post extending therefrom, and a cover plate attached to said post.

2. An eye cover comprising a cover plate and a base interconnected in spaced relation by a post, the base being shaped to fit in the eye socket, and the cover plate being concave on the side toward the base.

3. An eye cover comprising two concavo-convex members interconnected by a post in spaced, nested relation, one of said members being smaller than the other and shaped to fit in the eye socket.

ARTHUR A. BUSHNELL.

REFERENCES CITED

The following references are of record in the file of this patent:

UNITED STATES PATENTS

| Number | Name | Date |
|---|---|---|
| 2,389,223 | Werner | Nov. 20, 1945 |
| 1,642,661 | Robinson | Sept. 13, 1927 |